United States Patent [19]
Kleykamp

[11] 3,891,007
[45] June 24, 1975

[54] EXTERIORLY CORRUGATED HOSE OF COMPOSITE MATERIALS

[75] Inventor: Donald L. Kleykamp, Springboro, Ohio

[73] Assignee: Dayco Corporation, Dayton, Ohio

[22] Filed: Aug. 23, 1973

[21] Appl. No.: 390,816

Related U.S. Application Data

[62] Division of Ser. No. 268,298, July 3, 1972, abandoned.

[52] U.S. Cl. ............... 138/121; 138/137; 156/244
[51] Int. Cl. ............................................ F16l 11/12
[58] Field of Search .......... 138/121, 122, 137, 129, 138/154, 148, 141; 156/143, 244; 425/130–133

[56] References Cited
UNITED STATES PATENTS

| | | | |
|---|---|---|---|
| 2,901,024 | 8/1959 | Marsden, Jr. | 138/122 X |
| 3,186,438 | 6/1965 | Holmgren | 138/122 X |
| 3,240,645 | 3/1966 | Friedwald et al. | 138/154 X |
| 3,428,093 | 2/1969 | Guiles | 138/129 X |
| 3,477,891 | 11/1969 | Hawerkamp | 138/154 X |
| 3,561,493 | 2/1971 | Maillard | 425/133 X |
| 3,836,620 | 9/1974 | Bhuta et al. | 156/244 X |

Primary Examiner—Richard C. Queisser
Assistant Examiner—Daniel M. Yasich
Attorney, Agent, or Firm—Reuben Wolk

[57] ABSTRACT

An improved single-piece hose construction which provides minimum resistance to fluid flow, and an apparatus and method for making same, is provided and such hose construction is made by extruding elastomeric material into a moving mold to define an improved hose construction comprising an inner portion having a smooth inside surface and an outer portion having an undulating outside surface.

5 Claims, 7 Drawing Figures

EXTERIORLY CORRUGATED HOSE OF COMPOSITE MATERIALS

This is a division of application Ser. No. 268,298, filed July 3, 1972, now abandoned.

BACKGROUND OF THE INVENTION

There are numerous hose constructions in current use which are made entirely of elastomeric material and such hose constructions are made using various apparatus and methods. However, many of these current hose constructions are either easily crushed radially inwardly because they are made of comparatively thin materials or where efforts have been made to increase the crush resistance thereof such hose constructions are very stiff and comparatively inflexible. Others of these current hose constructions are unnecessarily complicated and must be made using relatively complex apparatus and/or methods whereby the cost of such constructions is usually excessive. Still others of these current hose constructions though of simple construction are unsatisfactory because they offer excessive resistance to fluid flow therethrough.

SUMMARY

This invention provides an improved single-piece hose construction and an improved apparatus and method for making same, wherein such hose construction provides minimum resistance to fluid flow therethrough inasmuch as it has a smooth inside surface, has optimum flexibility, and has optimum crush resistance and such crush resistance is provided by an outer portion which has an undulating outside surface. The hose construction is made by extruding elastomeric material into a moving mold at normal ambient pressure.

Other details, uses, and advantages of this invention will be readily apparent from the embodiments thereof presented in the following specification, claims, and drawings.

BRIEF DESCRIPTION OF THE DRAWINGS

The accompanying drawings show present preferred embodiments of this invention, in which.

DESCRIPTION OF ILLUSTRATED EMBODIMENTS

Figure 1:
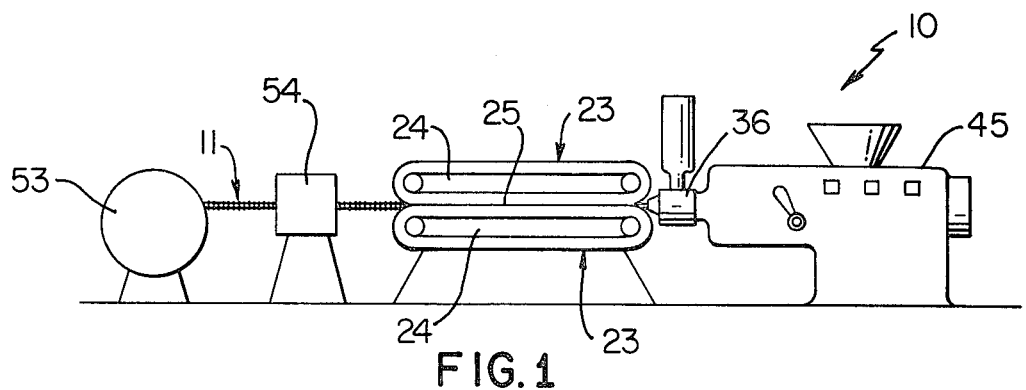
FIG. 1 is a schematic view in elevation illustrating one exemplary embodiment of an apparatus and method of this invention which is employed to make one exemplary embodiment of the hose construction of this invention.
Figure 2:
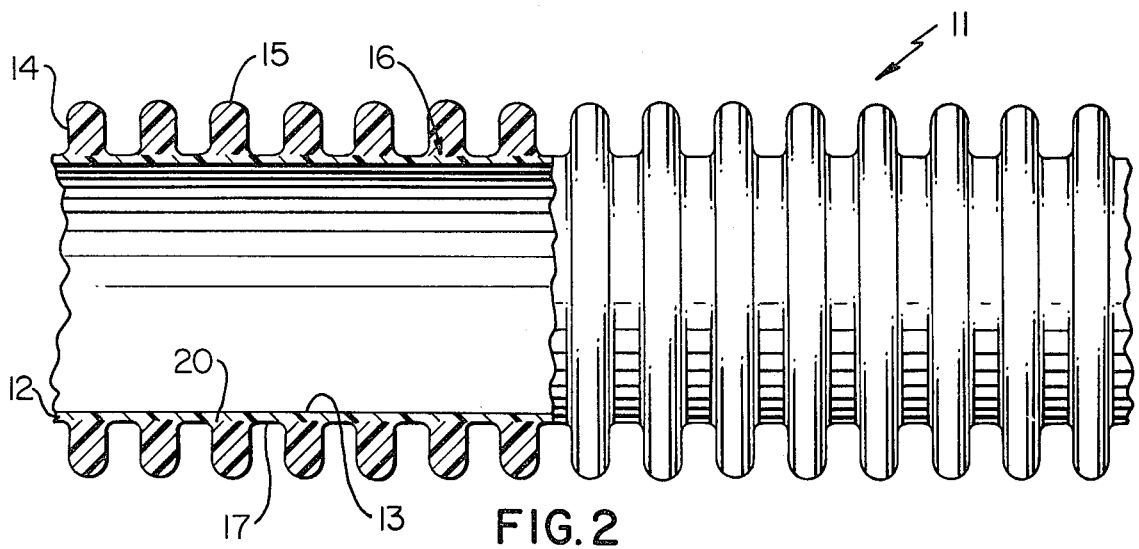
FIG. 2 is an enlarged fragmentary view of the hose construction made utilizing the apparatus and method of FIG. 1 with parts of such hose construction in elevation and parts in cross section.

Reference is now made to FIG. 1 of the drawings which illustrates one exemplary embodiment of an apparatus and method 10 of this invention which is particularly adapted to make one embodiment of a single-piece hose construction 11 of this invention which is made of elastomeric material and the hose construction 11 is illustrated in FIG. 2. The hose construction 11 comprises an inner portion 12 having a smooth inside surface 13 and an outer portion 14 which defines an undulating outside surface 15.

The hose construction 11 has its inner portion 12 made of one elastomeric material having particular properties while the outer portion 14 is made of another elastomeric material having properties which are different from the properties of the inner portion and the outer portion 14 is integrally bonded against the inner portion 12 to define the single-piece construction and such integral bonding is assured by selecting elastomeric materials which are compatible with each other. In addition, the integral bonding takes place by a flowing together of the inner portion 12 and outer portion 14 as illustrated at a typical location such as 16.

The outer portion 14 comprises means of solid cross section bonded against an outside surface 17 of the tubular inner portion 12 and such means of solid cross section is defined by a plurality of spaced rings also designated by the reference numeral 14. Each ring 14 has an inner part 20 thereof partially embedded within the inner portion 12 and in particular such inner part 20 is embedded beneath the outside surface 17 of portion 12.

The elastomeric material used to define the inner portion 12 preferably has a durometer hardness which is less than the durometer hardness of the elastomeric material used to define the outer portion or rings 14 and such durometer hardness of rings 14 may be approximately twice the hardness of the inner portion 12 whereby the hose construction 11 has optimum flexibility as defined by the comparatively softer inner portion 12 yet has improved crush resistance and resistance to external abrasion due to the protection offered by the comparatively hard integral rings 14. In addition, because the inner portion 12 has a smooth inside surface 13 which is preferably of circular cross-sectional outline the hose construction may be used to convey fluids with minimum resistance to fluid flow.

Figure 5:
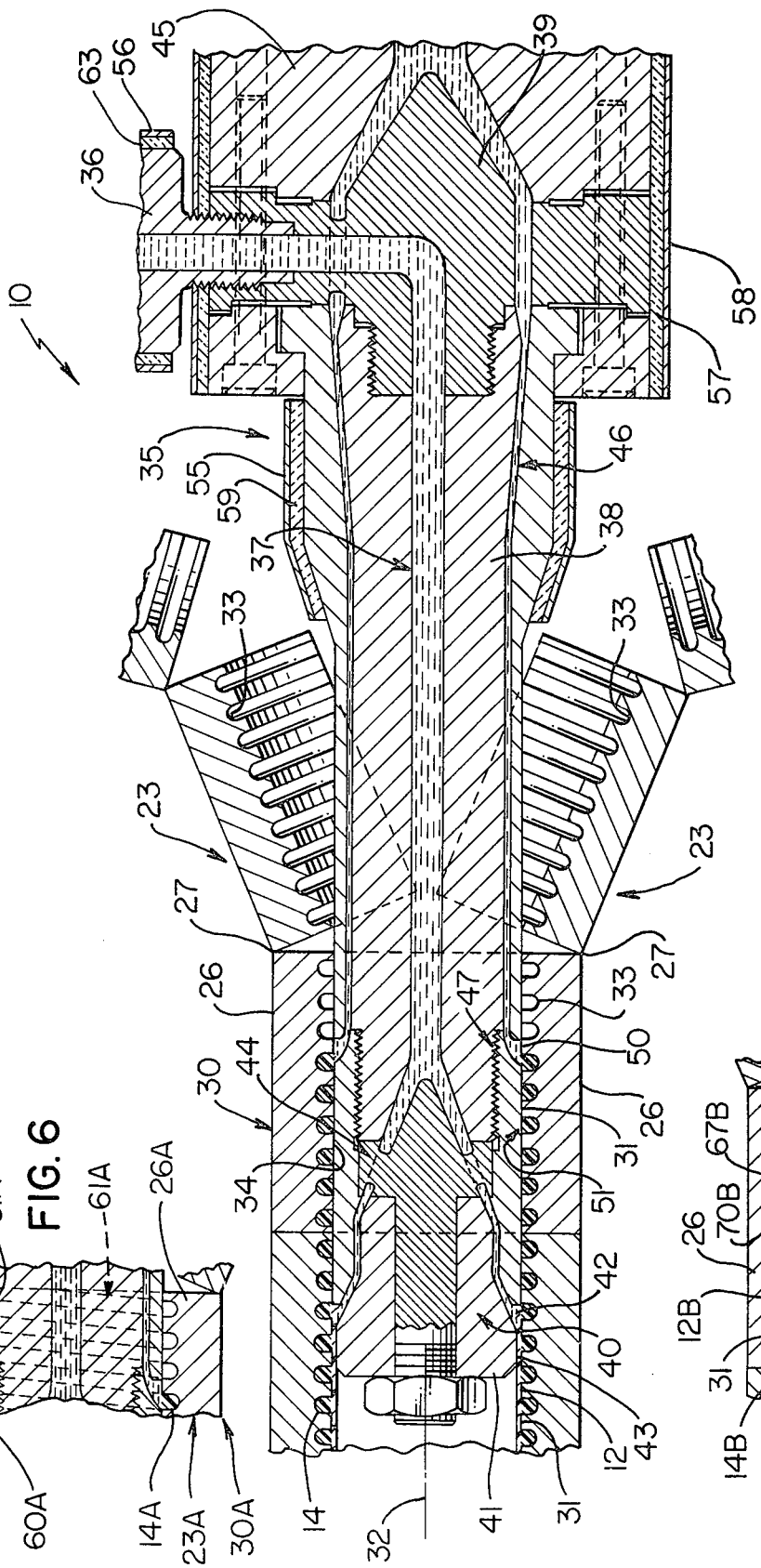
FIG. 5 is a view with parts in cross section, parts in elevation, and parts broken away illustrating certain main components of the apparatus illustrated in FIG. 1.

Having described the exemplary hose construction 11, reference is now made to FIGS. 1 and 5 of the drawings for a detailed description of the exemplary apparatus 10 which may be used to make such hose construction. The apparatus 10 comprises a pair of mold devices each designated generally by the same reference numeral 23 which are suitably supported in a known manner for movement in a pair of endless paths having a common rectilinear portion 25. Each device 23 is moved in a similar manner as a so-called crawler tread.

Each mold device 23 is comprised of a plurality of mold halves 26 which are suitably pivotally fastened together as indicated at 27 and as the mold halves are moved by their devices 23 they define what may be considered a moving housing designated generally by the reference numeral 30 during movement of the mold halves 26 along the common rectilinear portion 25. The housing 30 has a continuous tubular surface 31 and the tubular surface 31 has a central axis 32. A plurality of grooves 33 are provided in each mold half 26 and each groove extends into its mold half 26 in a direction radially away from the axis 32. The grooves 33 in the mold halves 26 cooperate to define spaced annular grooves in the mold halves and hence what may be considered as undulations 34 in the continuous tubular surface 31 during movement thereof along the common portion 25 of the endless path whereby the annular grooves and hence undulations 34 define the undulating outside surface of the hose construction 11 as an annular undulating surface.

The apparatus 10 has means for extruding elastomeric material within the housing 30 to define hose construction 11 and such extruding means is designated generally by the reference numeral 35 in FIG. 5. The extruding means 35 comprises a first extruder 36 of known construction which is suitably connected by conduit means 37 to first die means 40 supported within the moving housing 30. The conduit means 37 extends through a cantilevered support 38 supported by a support structure 39 and the die means 40 is supported by support 38 at its terminal end portion.

The die means 40 includes a mandrel 41 which is received within the mold halves along the common rectilinear portion 25 and in particular the mandrel 41 is received within the continuous tubular surface 31. The die means 40 also includes an annular die opening 42 which extends through the upstream portion of the mandrel and a first elastomeric material is conveyed from the extruder 36, through the conduit means 37, through the annular die opening 42, and between an outside cylindrical surface 43 of mandrel 41 and surface 31 to define the inner portion 12 of the hose construction 11. The cylindrical surface 43 is a smooth surface which defines the smooth inside surface of the hose construction 11. In addition, the conduit means 37 has a spider assembly 44 which includes a plurality of spaced diverging passages arranged in a roughly frustoconical pattern which spread the flow of elastomeric material from a small diameter to the comparatively larger diameter of the die opening 42.

The extruding means 35 of apparatus 10 has a second extruder 45 also of known construction and conduit means 46 connecting the discharge end of extruder 45 with associated die means 47 also supported by cantilevered support 38. The die means 47 comprises an annular die opening 50 which is particularly adapted to receive a second elastomeric material from the extruder 45 and such elastomeric material defines the outer portion or outer annular rings 14 of hose construction 11 as illustrated at 51 in FIG. 5.

From the above description, it is seen that elastomeric material from the extruders 36 and 45 is conveyed through associated conduit means in the cantilevered support 38 into the respective die means 40 and 47 to define the outer portion 14 of the hose construction 11 in the form of a plurality of spaced annular rings 14 and simultaneously define the inner portion 12 of such hose construction. The elastomeric materials from the extruders 36 and 45 flow together and are integrally bonded in a high strength manner which for all practical purposes is a fused bond free of clearly defined fused surfaces because of interflow and intermixing of the elastomeric materials in the area of bonding.

The apparatus 10 may be provided with a suitable wind-up mechanism 53, see FIG. 1, as the hose construction 11 is formed in a continuous manner in the cooperating mold devices 23 and such hose construction may be suitably wound in coil form on mechanism 53. The apparatus 10 may also comprise an automatic cutter 54 which is arranged downstream of the cooperating mold devices 23. The cutter 54 may be of any suitable known construction and may be used to cut the hose construction 11 to desired lengths. In the illustration of FIG. 1, the cutter 54 is shown in its inoperative position with the hose construction 11 extending therethrough in an unobstructed manner and being wound on the wind-up mechanism 53.

To assure that the apparatus 10 operates in a satisfactory manner without excessive cooling of the elastomeric materials flowing from extruders 36 and 45 the support 38 has a thermal insulating sleeve 59 detachably fastened in position therearound by a sleeve-like fastening device 55. Similarly, a thermal insulating sleeve 63 is fastened around the downstream portion of the extruder 36 with a fastening device 56 and an insulating sleeve 57 is fastened around the support structure 39 with a fastening device 58.

Figure 3:
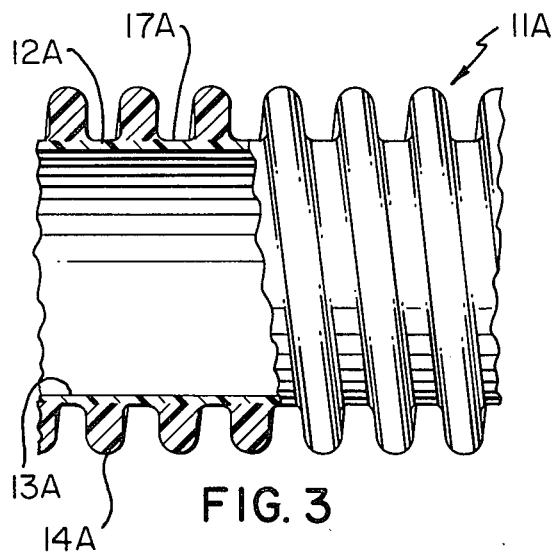
FIG. 3 is a view similar to FIG. 2 illustrating another embodiment of the hose construction of this invention which may be made utilizing a modified form of the apparatus and method of FIG. 1.

Another exemplary embodiment of the hose construction of this invention is illustrated in FIG. 3 of the drawings and the hose construction of FIG. 3 is similar to the hose construction 11; therefore, such hose construction will be designated generally by the reference numeral 11A and corresponding portions of such hose construction will be designated in the drawings by the same reference numerals as in the hose construction 11, whether or not such component portions are mentioned in the specification, followed by the letter designation A and not described again in detail.

The hose construction 11A comprises an inner portion 12A which has a tubular configuration and a smooth inside surface 13A and an outside surface 17A. The outer portion 14A is defined by a continuous means or member, also designated 14A, of solid cross section integrally bonded against the outside surface 17A and the member 14A extends in a substantially helical pattern about the inner portion 12A.

Figure 6:
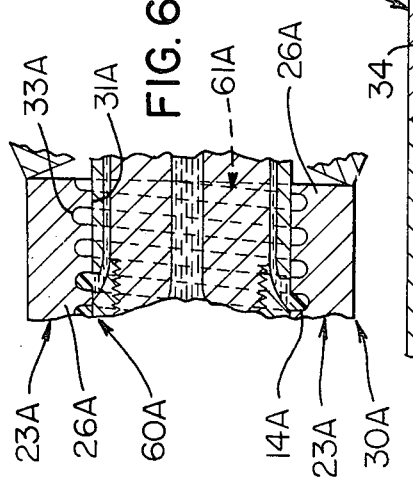
FIG. 6 is a fragmentary view illustrating portions of a pair of mold devices which may be used interchangeably with similar mold devices in the apparatus of FIG. 1 to define the hose construction of FIG. 3.

The hose construction 11A may be made utilizing the apparatus and method 10 merely by modifying the mold devices thereof and portions of such modified mold devices are shown in FIG. 6 and each designated by the reference numeral 23A. Each mold device 23A has the grooves 33A in its mold halves 26A suitably changed in configuration as shown at 60A so that once the cooperating mold halves 26A move along the common rectilinear portion 25A of the endless paths the continuous tubular surface 31A of housing 30A has a continuous helical groove, designated generally by the reference numeral 61A, defined therein. Thus, once elastomeric material from the extruder 45 is introduced through die means 47 into groove 61A the continuous member 14A of solid cross section is defined and immediately thereafter bonded against portion 12A in the substantially helical pattern defined by the helical groove 61A.

Figure 4:
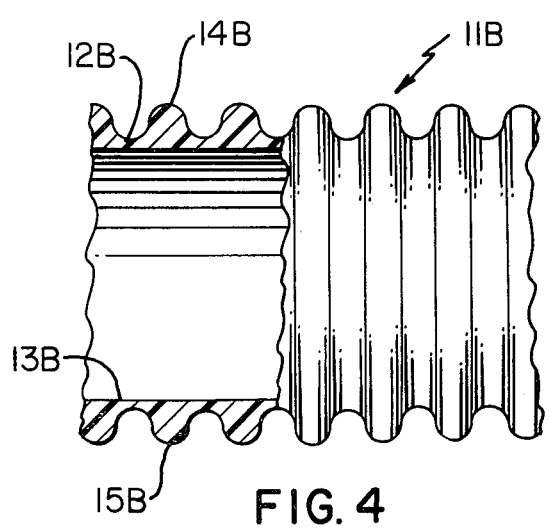
FIG. 4 is a fragmentary view similar to FIG. 2 illustrating still another embodiment of the hose construction of this invention which may be made utilizing another modified form of the apparatus and method of FIG. 1.

Another exemplary embodiment of the hose construction of this invention is illustrated in FIG. 4 of the drawings and the hose construction of FIG. 4 is similar to the hose construction 11; therefore, such hose construction will be designated generally by the reference numeral 11B and corresponding portions of such hose construction will be designated in the drawings by the same reference numerals as in the hose construction 11, whether or not such portions are mentioned in the specification, followed by the letter designation B and not described again in detail.

The main difference between the hose construction 11B and the hose construction 11 is that the hose construction 11B has its inner portion 12B and outer portion 14B made of the same elastomeric material and it will be seen that the inner portion 12B has a smooth inside surface 13B and an undulating outside surface 15B defined by annular undulations similar to the annular undulations of the hose construction 11. However, it will be appreciated that, if desired, the hose construction 11B may be made of a single elastomeric material having an inner portion 12B and outer portion 14B which has an undulating outside surface defined by a helical pattern similar to the hose construction 11A.

The hose construction 11B may be made utilizing the apparatus and method 10 suitably modified to eliminate the extruder 36 and related structures and conduit means used to convey elastomeric material from such extruder. Thus, only the extruder 45 is employed with the extruding means being suitably modified, as will now be explained, and designated by the reference numeral 35B.

The extruding means 35B comprises a suitable support structure which supports a cantilevered support 38B and conduit means 46B extends through the support structure therefor and support 38B and serves to convey flowable elastomeric material from the extruder 45 to die means 65B supported at the terminal end portion of support 38B.

The die means 65B includes a mandrel 66B received within the continuous tubular surface 31 defined by the mold halves 26 during movement thereof along the common rectilinear portion 25 and the die means 65B has an annular die opening 67B upstream of a smooth cylindrical surface 70B of mandrel 66B for extruding the flowable elastomeric material between the mandrel 66B and the continuous undulating tubular surface 31 to define the hose construction 11B. The hose construction thus defined has an inner portion 12B provided with a smooth inside surface 13B defined by smooth surface 70B and an outer portion or annular rings 14B made of the same elastomeric material as the inner portion 12B.

The hose constructions 11, 11A, and 11B may be made using suitable elastomeric materials including thermoplastic materials, thermosetting materials, resins, and either natural or synthetic rubber compounds.

Figure 7:
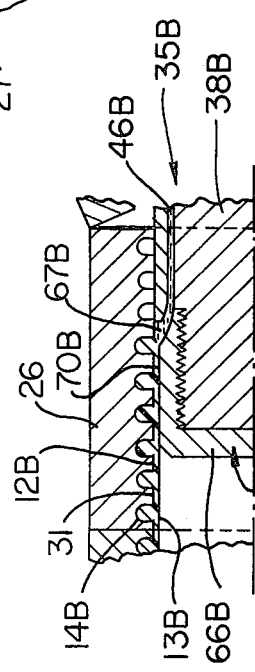
FIG. 7 is a view similar to the left-hand portion of FIG. 5 viewed only on one side of the central bisecting plane illustrating a modified die means used with the mold devices of FIG. 5 to define the hose construction of FIG. 4.

As will be apparent from FIGS. 5–7 of the drawings the unique hose construction of this invention is made employing an apparatus and method which utilizes moving mold means (such as cooperating devices 23, for example) which does not require differential pressures such as pressures above atmospheric or subatmospheric pressures or partial vacuum to define either a part of or the entire hose construction. In particular, suitable means is provided for extruding elastomeric material from one or more extruders into a moving mold and once extruded therein the elastomeric material is kept at normal ambient pressure whereby neither complex devices nor method steps are required to define the unique hose constructions 11, 11A and 11B of this invention. As previously indicated, the outer portion of each hose 11 and 11A is preferably made of an elastomeric material which has a greater durometer hardness than the hardness of the elastomeric material used to make the inner portion whereby a highly flexible hose construction having improved crush and external abrasion resistance is provided. Although the characteristics of the elastomeric material employed may vary, the elastomeric material comprising the inner portion of the completed hose construction may have a Shore durometer hardness ranging between 40 and 60, on the "A" scale, while the elastomeric material defining the outer portion may have a Shore durometer hardness ranging between 80 and 100, also on the "A" scale. The Shore durometer is generally well known in the art and hence will not be described in detail. Basically, such durometer comprises a small conical hammer fitted with a diamond point and acting in a glass tube. The hammer is made to strike the material under test and the degree of rebound is noted on an associated graduated scale. Generally, the harder the material, the greater will be the rebound.

While present exemplary embodiments of this invention, and methods of practicing the same, have been illustrated and described, it will be recognized that this invention may be otherwise variously embodied and practiced within the scope of the following claims.

What is claimed is:

1. A single piece hose construction comprising, inner and outer surface portions, said inner portion made of a first elastomeric material and having a smooth inside surface, and said outer portion made of a second elastomeric material substantially harder than the first material, said first and second materials fused and integrally bonded together and free of defined fused surfaces, said outer portion comprising means of a solid cross section deeper than said inner portion, said means defining an undulating outside surface for said hose construction.

2. A hose construction as set forth in claim 1 in which said first elastomeric material has a durometer hardness which is less than the durometer hardness of said second elastomeric material to thereby provide a flexible hose construction having improved crush and external abrasion resistance.

3. A hose construction as set forth in claim 2 in which said first elastomeric material has a hardness which is roughly one half the hardness of said second elastomeric material.

4. A hose construction as set forth in claim 2 in which said inner portion has a tubular configuration provided with said inside surface and an outside surface and said outer portion is defined by a plurality of spaced rings of solid cross section integrally bonded against said outside surface.

5. A hose construction as set forth in claim 2 in which said inner portion has a tubular configuration provided with said inside surface and an outside surface, and said outer portion is defined by a continuous member of solid cross section integrally bonded against said outside surface in a substantially helical pattern.

* * * * *